United States Patent
Kim et al.

(10) Patent No.: US 10,567,091 B2
(45) Date of Patent: Feb. 18, 2020

(54) BASE STATION FOR CANCELLING TRANSMITTER NOISE PRESENT IN RECEPTION BAND AND METHOD FOR OPERATING SAME

(71) Applicant: Samsung Electronics Co., Ltd, Suwon-si (KR)

(72) Inventors: Jaebum Kim, Seoul (KR); Jungwoo Ku, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/093,099

(22) PCT Filed: Apr. 11, 2017

(86) PCT No.: PCT/KR2017/003902
§ 371 (c)(1),
(2) Date: Oct. 11, 2018

(87) PCT Pub. No.: WO2017/179880
PCT Pub. Date: Oct. 19, 2017

(65) Prior Publication Data
US 2019/0140749 A1    May 9, 2019

(30) Foreign Application Priority Data

Apr. 11, 2016  (KR) .................... 10-2016-0044167

(51) Int. Cl.
*H04B 15/00*  (2006.01)
*H04B 1/12*   (2006.01)
(Continued)

(52) U.S. Cl.
CPC ......... *H04B 15/005* (2013.01); *H04B 1/1018* (2013.01); *H04B 1/123* (2013.01);
(Continued)

(58) Field of Classification Search
CPC .... H04B 15/005; H04B 17/12; H04B 1/1018; H04B 1/123; H14B 1/525; H14B 15/02
See application file for complete search history.

(56) References Cited

U.S. PATENT DOCUMENTS

2010/0267340 A1*  10/2010 Lee .................... G10L 21/0208
                                                              455/63.1
2012/0028663 A1    2/2012 Nejatian et al.
(Continued)

FOREIGN PATENT DOCUMENTS

| JP | 2011-217313 A | 10/2011 |
|---|---|---|
| KR | 10-2001-0090039 A | 10/2001 |
| KR | 10-2004-0092766 A | 11/2004 |

OTHER PUBLICATIONS

European Patent Office, "Supplementary European Search Report," Application No. EP17782635.1, dated Mar. 4, 2019, 6 pages.
(Continued)

*Primary Examiner* — Jaison Joseph

(57) ABSTRACT

A base station for cancelling a transmitter noise present in a reception band, according to the embodiment of the present invention comprises: a transmitting and receiving unit for transmitting and receiving a signal; an uplink signal detector for detecting a first signal extracted from a reception path of the base station and a second signal extracted by filtering, on the basis of the reception band, a signal transmitted on a transmission path of the base station, and for determining, on the basis of the detection result, whether an uplink signal transmitted from a terminal is included in the first signal; and a processor for determining whether to cancel the transmitter noise depending on whether the uplink signal is included in the first signal.

13 Claims, 11 Drawing Sheets

(51) Int. Cl.
    *H04B 1/525* (2015.01)
    *H04B 17/12* (2015.01)
    *H04B 1/10* (2006.01)
    *H04B 15/02* (2006.01)
    *H04B 1/04* (2006.01)

(52) U.S. Cl.
    CPC ............ *H04B 1/525* (2013.01); *H04B 15/02* (2013.01); *H04B 17/12* (2015.01); *H04B 2001/0408* (2013.01)

(56) References Cited

U.S. PATENT DOCUMENTS

2013/0201050 A1* 8/2013 Hellsten .................. G01S 7/006
                                                              342/21
2014/0194071 A1   7/2014 Wyville
2014/0269852 A1   9/2014 Pratt et al.
2015/0280887 A1* 10/2015 Ko ........................ H04B 1/525
                                                              370/330

OTHER PUBLICATIONS

International Search Report dated Jul. 24, 2017 in connection with International Patent Application No. PCT/KR2017/003902.
Written Opinion of the International Searching Authority dated Jul. 24, 2017 in connection with International Patent Application No. PCT/KR2017/003902.
Mohammad Omer, "Towards Harmonious Co-existence: Linear and Nonlinear Techniques for Interference Management in RFICs", May 2013, 146 pages.

* cited by examiner

US 10,567,091 B2

BASE STATION FOR CANCELLING TRANSMITTER NOISE PRESENT IN RECEPTION BAND AND METHOD FOR OPERATING SAME

CROSS-REFERENCE TO RELATED APPLICATIONS

This application is a 371 of International Application No. PCT/KR2017/003902 filed Apr. 11, 2017, which claims priority to Korean Patent Application No. 10-2016-0044167 filed Apr. 11, 2016, the disclosures of which are herein incorporated by reference in their entirety.

BACKGROUND

1. Field

The present invention relates to a base station and its operation method that is capable of cancelling transmitter noise present in a reception band and, in particular, to a base station and its operation method that is capable of securing a stable reception performance without degradation of reception even when there is an uplink signal transmitted by a terminal in the reception band.

2. Description of Related Art

A radio frequency (RF) transceiver is designed to transmit and receive a radio frequency signal. Also, the RF transceiver is designed so as to minimize interference at the receiver that is caused by a transmit signal of its own transmitter, using offsets in its transmission and reception bands. One of other interference cancellation schemes for interference reduction at the receiver is to cancel unnecessary frequency components from the transmit signal using a special filter such as a surface acoustic wave (SAW) filter.

Furthermore, in order to reduce transmitter noise, the RF transceiver may generate an estimation value of the noise that is predicted to be leaked from the transmit signal. Then this estimation value may be used for additional transmitter noise cancellation. This process is called transmit noise cancellation.

However, if any uplink signal transmitted by a terminal is present in addition to the transmitter noise in the reception band, the noise estimation value becomes inaccurate, and this causes insufficient noise cancellation or even a significant noise increase, resulting in a reduction of reception sensitivity.

SUMMARY

The present invention aims to provide a base station and its operation method for securing a stable reception performance without reception sensitivity reduction even when an uplink signal transmitted by a terminal is present in the reception band.

Solution to Problem

In accordance with an aspect of the present invention, a base station for cancelling transmitter noise present in a reception band is provided. The base station includes a transceiver configured to transmit and receive a signal, an uplink signal detector configured to check a first signal extracted from a reception path of the base station and a second signal extracted by filtering a signal being transmitted by the base station from a transmission path based on the reception band and determine whether the first signal includes an uplink signal transmitted by a terminal based on a checking result, and a processor configured to determine whether to cancel the transmitter noise depending on whether the first signal includes the uplink signal.

Preferably, the processor is configured to control, if the first signal includes the uplink signal, to not perform the transmitter noise cancellation and, if the first signal includes no uplink signal, to cancel the transmitter noise.

Preferably, the processor is configured to estimate a first coefficient by performing a first operation on the first and second signals and determine whether to apply the first coefficient as a filter coefficient to the filter outputting the transmitter noise.

Preferably, the base station further includes a final reception signal generator configured to output a final reception signal by cancelling the transmitter noise as an output of the filter from the first signal extracted from the reception path.

Preferably, the processor is configured to apply one of the first coefficient, a second coefficient applied to the filter before estimating the first coefficient, and a third coefficient prestored as an optimal value in accordance with temperature as the filter coefficient.

Preferably, the uplink signal detector is configured to compare a first power of the first signal and a second power of the second signal and determine, if a first value indicating the first power is less than a second value obtained by adding a noise power of the reception path to a predetermined ratio of the second power, that the first signal includes no uplink signal.

Preferably, the processor is configured to calculate, if the first signal includes no uplink signal, a fourth coefficient value through a least square method with the first and second signals and determine, if a cancellation value of the first signal that is calculated with the first and second signals and the fourth coefficient is less than a preconfigured expectation value, to use the first and second signals.

Preferably, the cancellation value is a normalized mean square error of the first signal and an estimated signal of the first signal, and the estimated signal is calculated with the second signal and the fourth coefficient.

Preferably, the processor is configured to calculate a cross-correlation vector based on at least one of the first and second signals, time-average the cross-correlation vector, calculate a covariance matrix based on at least one of the first and second signals, time-average the covariance matrix, and estimate the first coefficient using the time-averaged cross-correlation vector and the covariance matrix.

In accordance with another aspect of the present invention, an operation method of a base station for cancelling transmitter noise present in a reception band is provided. The method includes checking a first signal extracted from a reception path of the base station and a second signal extracted by filtering a signal being transmitted by the base station from a transmission path based on the reception band, determining whether the first signal includes an uplink signal transmitted by a terminal based on a checking result, and determining whether to cancel the transmitter noise depending on whether the first signal includes the uplink signal.

Advantageous Effects of Invention

The base station and its operation method for cancelling a transmitter noise present in a reception band according to an embodiment of the present invention is advantageous in terms of securing a stable reception performance with no reception sensitivity degradation even when an uplink signal transmitted by a terminal is present in the reception band.

Also, the base station and its operation method for cancelling a transmitter noise present in a reception band according to an embodiment of the present invention is advantageous in terms of securing a stable noise cancellation performance by estimating a new coefficient for cancelling the transmitter noise and applying a fixed coefficient even when the estimated coefficient is incorrect.

BRIEF DESCRIPTION OF THE DRAWINGS

A brief description of each drawing is provided in order to more sufficiently understand the drawings cited in the detailed description of the present invention.

DETAILED DESCRIPTION

Figure 1:
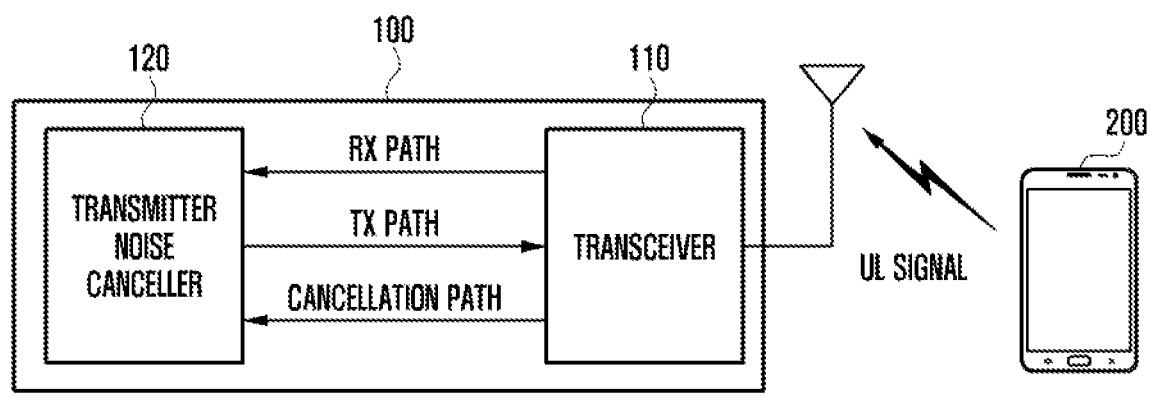
FIG. 1 is a diagram for explaining a procedure for cancelling transmitter noise at a receiver in a base station according to an embodiment of the present invention.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a diagram for explaining a procedure for cancelling transmitter noise at a receiver in a base station according to an embodiment of the present invention.

In reference to FIG. 1, the base station 100 includes a transceiver 110 and a transmitter noise canceller 120 and is capable of transmitting and receiving a signal to and from a terminal 200.

The transceiver 110 may up-convert a base band signal to a radio frequency signal and amplify the radio frequency signal by means of a power amplifier on a transmit (Tx) path and radiate the amplified signal by means of an antenna.

The transceiver 110 may receive a radio frequency signal by means of an antenna, amplify the radio frequency signal by means of a low-noise amplifier and down-convert the amplified signal to a baseband signal on a receive (Rx) path, and send the baseband signal to a modem included in the base station 100.

The transmitter noise canceller 120 may cancel the transmitter noise (Tx-to-Rx noise) present in the receiver via a cancellation path in order to protect the signal amplified by the power amplifier so as to have a high power level on the Tx path of the transceiver 110 from flowing into the Rx path (or Rx band).

The transmitter noise canceller 120 may cancel the Tx signal out of the reception band to alleviate the performance requirement of the filter using a digital signal processing (DSP) technique. In order to accomplish this, the transmitter noise canceller 120 senses the Tx signal in the reception band by means of the cancellation path as an additional signal path.

The transmitter noise canceller 120 may digitalize the signal detected on the cancellation path and the signal through a filter to estimate the Tx-to-Rx noise signal. That is, the transmitter noise canceller 120 performs filtering on the Tx signal flowing on the Tx path via the cancellation path based on the Rx band and generates (or recovers) the Tx-to-Rx noise based on the detected signal and the filter. Here, the coefficient value being applied to the filter may be calculated using the data obtained by digitalizing the Rx signal and the cancellation path signal.

The transmitter noise canceller 120 may output (or generate) a final Rx signal by removing the Tx-to-Rx noise signal as the output of the filter from the Rx signal.

In the case where a high power uplink signal transmitted by the terminal 200 is present in addition to the Tx-to-Rx noise in the Rx band, however, the estimation value of the coefficient of the filter for generating the Tx-to-Rx noise signal becomes inaccurate, and this causes insufficient noise cancellation or even significant noise increase, which results in a reduction of reception sensitivity.

The present invention proposes a method for estimating (or updating) a coefficient value of a filter for generating the Tx-to-Rx signal in consideration of the presence of an uplink signal in addition to the Tx-to-Rx noise in the Rx band.

The transmitter noise canceller 120 is capable of securing a stable reception performance without degradation of the signal reception sensitivity by detecting an uplink signal transmitted by a terminal and estimating (or updating) the coefficient of the filter only when the uplink signal is less than a predetermined value.

Figure 2:
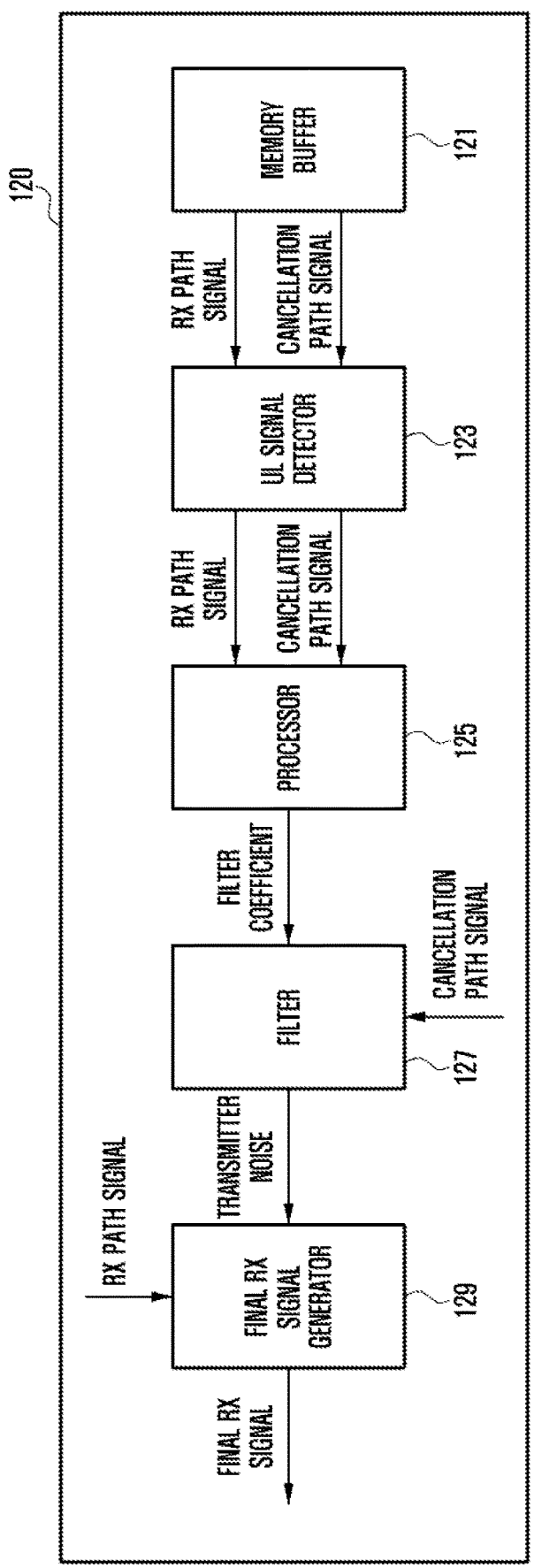
FIG. 2 is a block diagram illustrating a configuration of the transmitter noise canceller of FIG. 1.

FIG. 2 is a block diagram illustrating a configuration of the transmitter noise canceller of FIG. 1.

In reference to FIG. 2, the transmitter noise canceller 120 includes a memory buffer 1221, an uplink signal detector 123, a processor 125, a filter 127, and a final Rx signal generator 129.

The memory buffer 121 may send the uplink signal detector 123 an Rx path signal extracted by converting a signal output from the low-noise amplifier to a digital signal to and a cancellation path signal extracted by converting a signal output from an Rx band-pass filter to a digital signal. The cancellation path signal means the signal extracted by filtering the Tx signal flowing on the Tx path based on the Rx band.

The uplink signal detector may check the Rx path signal and the cancellation path signal output from the memory buffer 121 to determine whether the uplink signal transmitted by the terminal is included in the Rx path signal.

The uplink signal detector 123 may compare a first power of the Rx path signal and a second power of the cancellation path signal and determine whether the Rx path signal includes the uplink signal based on the comparison result.

According to an embodiment of the present invention, if a first value corresponding to the first power is less than a second value obtained by adding a noise power of the Rx path itself to a predetermined ratio of the second power, the uplink signal detector 123 determines that the Rx path signal includes no uplink signal.

According to another embodiment of the present invention, if the first value is equal to or greater than the second value, the uplink signal detector 123 may determine that the Rx path signal includes an uplink signal.

The processor 125 may determine whether to remove the Tx-to-Rx noise from the Rx path signal depending on whether the Rx path signal includes an uplink signal transmitted by the terminal.

If it is determined that the Rx path signal includes an uplink signal, the processor 125 may control to remove the Tx-to-Rx noise from the Rx path signal; if it is determined that the Rx path signal includes no uplink signal, the processor 125 may control to remove the Tx-to-Rx noise from the Rx path signal.

The processor may determine whether to use the Rx path signal and the cancellation path signal in estimating (or updating) the coefficient of the filter 127 in consideration of the cancellation level of the Rx signal path in addition to the factor on whether the Rx path signal includes an uplink signal.

According to an embodiment of the present invention, if it is determined that the Rx path signal includes no uplink signal, the processor 125 may calculate a specific coefficient through a least square method with the Rx path signal and the cancellation path signal from the uplink signal detector 123.

If the cancellation value of the Rx path signal that is calculated with the Rx path signal, the cancellation path signal, and the specific coefficient is less than a predetermined expected value, the processor 125 may determine to use the Rx path signal and the cancellation path signal. The cancellation value is a normalized mean square error of the estimated signal on the Rx path and an estimated signal of the Rx path signal, and the estimated signal may be calculated using the cancellation path signal and the specific coefficient.

If it is determined to use the Rx path signal and the cancellation path signal in estimating (or updating) the coefficient for the filter 127, the processor 125 may estimate a first coefficient through a first operation on the Rx path signal and the cancellation path signal and determine whether to apply the first coefficient as a filter coefficient of the filter 127.

The first operation may include calculating a cross-correlation vector based on at least one of the Rx path signal and the cancellation path signal, time-averaging the coefficient vector, calculating a covariance matrix based on at least one of the Rx path signal and the cancellation path signal, time-averaging the covariance matrix, and calculating the first coefficient using the time-averaged cross-correlation vector and the covariance matrix.

The processor may determine whether to apply one of the first coefficient, a second coefficient that has been applied to the filter before estimation of the first coefficient, and a third coefficient prestored as the optimal value in accordance with temperature as the filter coefficient of the filter 127.

According to an embodiment of the present invention, the processor 125 may calculate a first cancellation value of the Rx path signal using the Rx path signal, the cancellation path signal, and the first coefficient, calculate a second cancellation value of the Rx path signal using the Rx path signal, the cancellation path signal, and the second coefficient, and calculate a third cancellation value of the Rx path signal using the Rx path signal, the cancellation path signal, and the third coefficient. The processor 125 may apply the coefficient corresponding the smallest one of the first, second, and third cancellation values (i.e., one of the first to third coefficients) as the filter coefficient value.

In this case, the first cancellation value is a mean square error of the Rx path signal and a first estimated signal for the Rx path signal, and the first estimated signal may be calculated using the cancellation path signal and the first coefficient. The second cancellation value is a mean square error of the Rx path signal and a second estimated signal for the Rx path signal, and the second estimated signal may be calculated using the cancellation path signal and the second coefficient. The third cancellation value is a mean square error of the Rx path signal and a third estimated signal for the Rx path signal, and the third estimated signal may be calculated using the cancellation path signal and the third coefficient.

The filter 127 may receive the filter coefficient from the processor 125, apply the filter coefficient, and generate (recover) the Tx-to-Rx noise signal using the filter coefficient and the cancellation path signal.

The final Rx signal generator 129 may output a final Rx signal by removing the Tx-to-Rx noise signal as an output of the filter 127 from the Rx path signal output through the Rx path.

Figure 3:
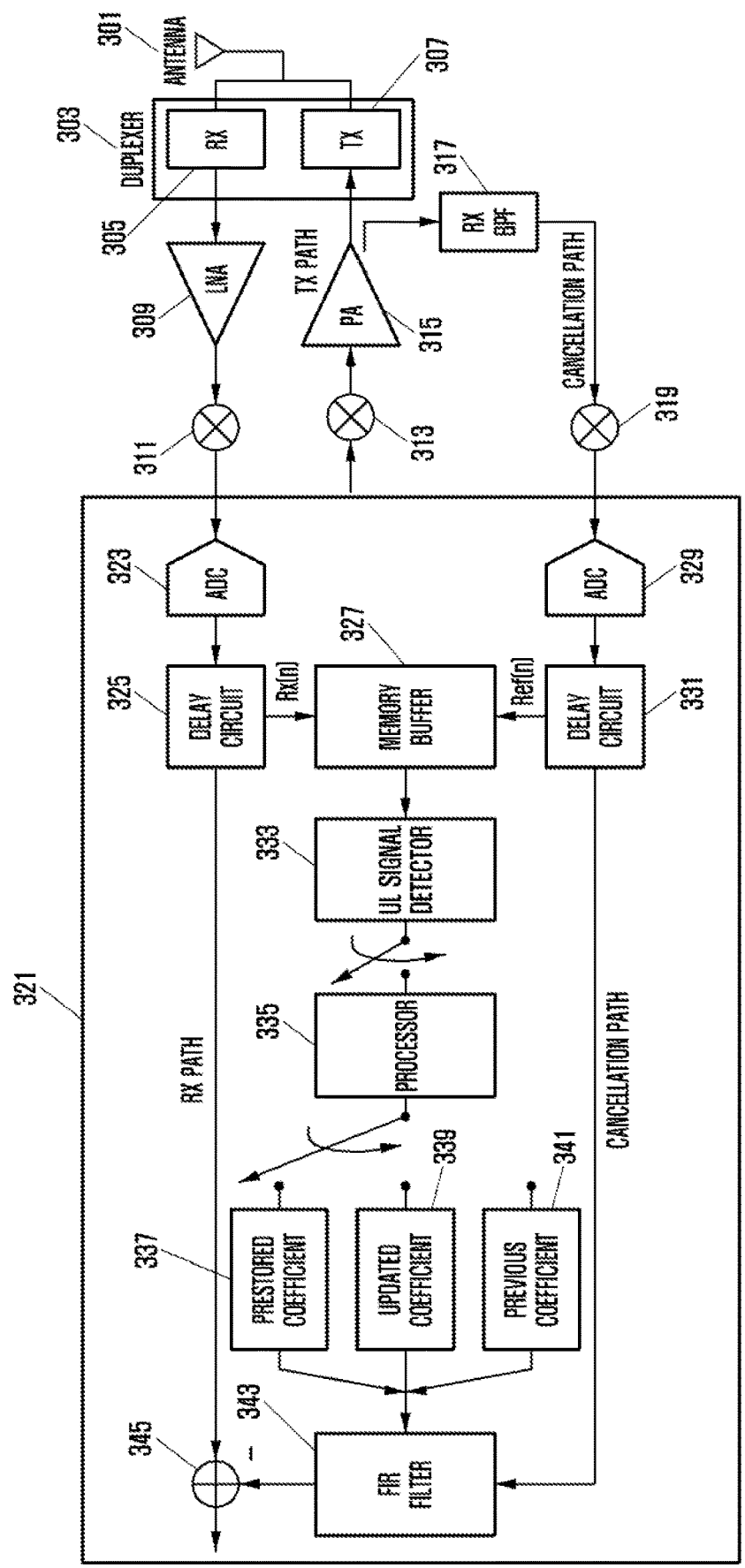
FIG. 3 is a block diagram illustrating a detailed configuration of a base station for cancelling transmitter noise present on an Rx path according to an embodiment of the present invention.

FIG. 3 is a block diagram illustrating a detailed configuration of a base station for cancelling Tx-to-Rx noise present on an Rx path according to an embodiment of the present invention.

In reference to FIG. 3, the base station includes an antenna 301, a duplexer 303, a low-noise amplifier 309, a first mixer 311, a second mixer 313, a power amplifier 315, a Rx band-pass filter 317, a third mixer 319, and a transmitter noise canceller 321.

The duplexer 303 protects the receiver from the Tx power in a transmission mode and provides an echo signal to the receiver in a reception mode to use the antenna 301 in common for transmission and reception. The duplexer 303 includes a receiver 305 and a transmitter for transmitting and receiving signals via the antenna 301.

On the Rx path, the low-noise amplifier 309 may amplify the signal received by the receiver 305 and send the amplified Rx signal to the first mixer 311.

On the Tx path, the second mixer 313 may send a Tx signal to the power amplifier 315, which may amplify the Tx signal and send the amplified Tx signal to the transmitter 307.

On the cancellation path, the Rx band-path filter 310 may receive the amplified Rx signal from the power amplifier 315, perform filtering on the amplified Tx signal based on the Rx band, and send the filtered signal to the third mixer 319.

The transmitter noise canceller 321 may include a first analog-digital converter (ADC) 323, a first delay circuit 325, a memory buffer 327, a second ADC 329, a second delay circuit 331, an uplink signal detector 333, a processor 335, a finite impulse response (FIR) filter 343, and a final Rx signal generator 345.

The first ADC 323 may convert the signal received through the low-noise amplifier 309 and the first mixer 311 to a digital signal as a first signal and send the first signal to the first delay circuit 325.

The second ADC 329 may convert the signal received through the Rx band-path filter 317 and the third mixer 319 to a digital signal as a second signal and send the second signal to the second delay circuit 331.

The memory buffer 327 may send the first signal (Rx(n)) output through the first delay circuit 325 and the second signal (Ref(n)) output through the second delay circuit 331 to the uplink signal detector 333.

The uplink signal detector 333 may detect an uplink signal transmitted by a terminal and, if the uplink signal is less than a predetermined value, determine that the first signal (Rx(n)) includes no uplink signal.

The uplink signal detector 333 may determine that the first signal (Rx(n)) includes no uplink signal if the condition of Inequity 1 is fulfilled.

$$PRx < PRef \times BO + PN \qquad \text{[Inequity 1]}$$

In Inequity 1, PRx denotes a first power of the first signal (Rx(n)), PRef denotes a second power of the second signal Ref(n)), BO denotes an expected value for determining back-off power of the second power, and PN denotes a power of the signal extracted on the Rx path when no Tx signal is transmitted.

The processor 335 may determine whether to remove the Tx-to-Rx noise from the first signal Rx(n) depending on whether the first signal Rx(n) includes an uplink signal. If it is determined that the first signal Rx(n) includes an uplink signal, the processor 335 may control to not remove the Tx-to-Rx noise; if it is determined that the first signal Rx(n) includes no uplink signal, the processor 335 may control to remove the Tx-to-Rx noise.

If it is determined that the first signal Rx(n) includes no uplink signal, the processor 335 may calculate a specific coefficient through a least square method with the first signal Rx(n) and the second signal Ref(n) and, if the cancellation amount of the first signal Rx(n) fulfils Equation 2, determine to use the first signal Rx(n) and the second signal Ref(n) for estimating (updating) the coefficient for the FIR filter 343.

$$NMSE = \Sigma \frac{[(Rx(n) - ERx(n))^2]}{[Rx(n)^2]} < CANCEL \qquad \text{[Equation 2]}$$

In Equation 2, NMSE denotes the cancellation amount of the first signal Rx(n), ERx(n) denotes an estimated signal corresponding to the first signal Rx(n), and CANCEL denotes an expected value of the cancellation amount of the first signal Rx(n).

The ERx(n) may be calculated by Equation 3.

$$ERx(n) = \overrightarrow{Ref}^t(n) \times \vec{h}_i(n),$$

$$\text{where } \overrightarrow{Ref}(n) = \begin{bmatrix} Ref(n) \\ \vdots \\ Ref(n-M) \end{bmatrix} \text{ and } \vec{h}_i = \begin{bmatrix} h_{i,0} \\ \vdots \\ h_{i,M} \end{bmatrix}$$

[Equation 3]

In Equation 3, $\overrightarrow{Ref}(n)$ denotes a vector corresponding to the second signal Ref(n), $\vec{h}_i(n)$ denotes a coefficient vector estimated after the $i^{th}$ repetition (here, i is a natural number), M denotes the largest delay of a memory term, and t denotes a transposition operator.

If it is determined to use the first signal Rx(n) and the second signal Ref(n) in estimating (or updating the coefficient for the FIR filter 343, the processor 335 may estimate a new coefficient by time-averaging the cross-correlation vector and covariance matrix calculated with the first signal Rx(n) and the second signal Ref(n) and the previous values.

The processor 335 may perform a long-term averaging on the cross-correlation vector using Equation 4.

$$\vec{v}_i = \vec{v}_i \times (1-\alpha) + \begin{bmatrix} v(0) \\ v(1) \\ \vdots \\ v(M) \end{bmatrix} \times \alpha$$

[Equation 4]

In Equation 4, $\vec{v}_i$ denotes the cross-correlation averaging vector at the ith repetition, $\alpha$ denotes the averaging factor, and v(m) denotes the cross-correlation among the input signal, the second signal Ref(n), the target signal, and the first signal Rx(n).

The v(m) may be calculated by Equation 5.

$$v(m) = \Sigma_{n=M}^{N-1} Ref(n-m)^* \times Rx(n), 0 \leq n \leq M$$

[Equation 5]

In Equation 5, N denotes the number of samples of extracted data, and * the conjugate operator.

The processor 335 may perform a long-term averaging on the covariance matrix using Equation 6.

$$C_i = C_{i-1} \times (1-\alpha) + \begin{bmatrix} c(0,0) & c(0,1) & \ldots & c(0,M) \\ c(1,0) & c(1,1) & \ldots & c(1,M) \\ \vdots & \vdots & \ddots & \vdots \\ c(M,0) & c(M,1) & \cdots & c(M,M) \end{bmatrix}$$

[Equation 6]

In Equation 6, $C_i$ denotes the covariance matrix at the $i^{th}$ repetition, and $c(m_1, m_2)$ denotes covariance matrix elements calculated with the extracted data.

The $c(m_1, m_2)$ may be calculated by Equation 7.

$$c(m_1, m_2) = \Sigma_{n=M}^{N-1} Ref(n-m_1)^* \times Ref(n-m_2), 0 \leq m_1 \leq M \text{ and } 0 \leq m_2 \leq M$$

[Equation 7]

The processor 335 may store pre-calculated temperature-specific optimal coefficient values in the form of a table because the coefficient value for the FIR filter 343 varies slowly according to the temperature.

The processor 335 may apply one of the updated coefficients 339, the previous coefficients used by the FIR filter 343, and fixed coefficients 337 prestored as the optimal values in accordance with the temperature to the FIR filter 343. Here, the updated coefficients 339 denote the coefficients that are newly estimated using Equations 4 to 7.

The processor 335 may apply a coefficient minimizing the mean square of the cancellation error calculated by Equation 8 among the coefficients (i.e., updated coefficients 339, previous coefficients 341, and prestored coefficients 337) to the FIR filter 343.

$$e_{ms} = (\Sigma_{n=M}^{N-1} |e(n)|^2)/(N-M) = (\Sigma_{n=M}^{N-1} |Rx(n) - ERx(n)|^2)/N-M)$$

[Equation 8]

In Equation 8, ERx(n) may be calculated by Equation 3.

The final Rx signal generator 345 may output a final Rx signal by removing the Tx-to-Rx noise as an output of the FIR filter 343 from the first signal Rx(n) received through the Rx path. The final Rx signal generator may be implemented with a subtractor.

Figure 4:
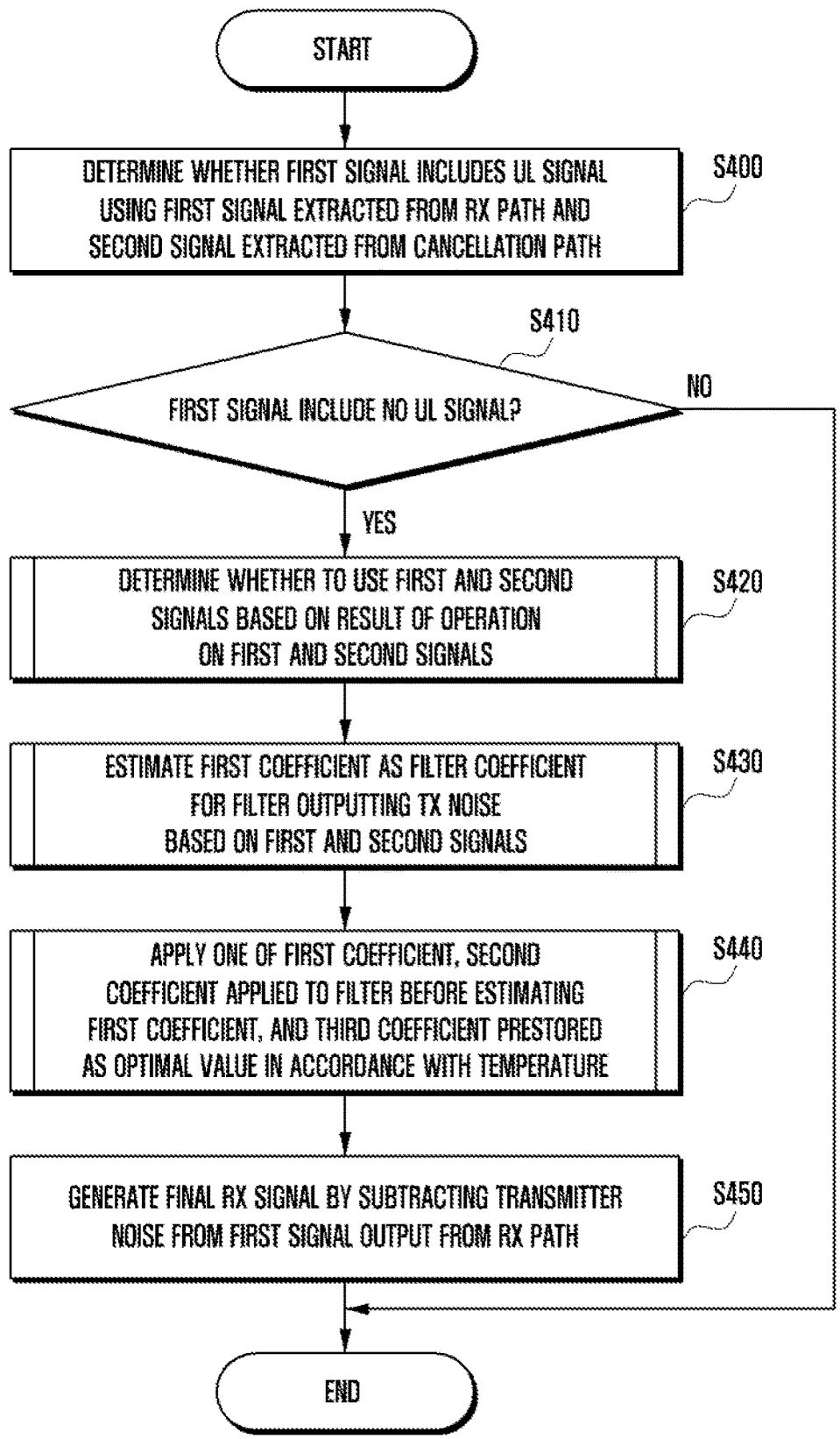
FIG. 4 is a flowchart illustrating an operation method of a base station for cancelling transmitter noise present in an Rx path according to an embodiment of the present invention.

FIG. 4 is a flowchart illustrating an operation method of a base station for cancelling Tx-to-Rx noise present in an Rx path according to an embodiment of the present invention.

In reference to FIGS. 1 to 4, the base station may determine at step S400 whether a first signal includes an uplink signal transmitted by a terminal based on a first signal extracted from an Rx path and a second signal extracted from a cancellation path.

If it is determined at step S410 that the first signal includes no uplink signal, the base station determines at step S420 whether to use the first and second signals based on a result of an operation performed on the first and second signals.

If it is determined at step S410 that the first signal includes an uplink signal, the base station may stop the operations of cancelling Tx-to-Rx noise.

At step S430, the base station may estimate a first coefficient as a filter coefficient for the filter outputting the Tx-to-Rx noise based on the first and second signals.

At step S440, the base station may apply one of a second coefficient that has been applied to the filter before the estimation of the first coefficient and a second coefficient that is previously stored as an optimal value in accordance with the temperature.

At step S450, the base station may generate a final Rx signal by removing the Tx-to-Rx noise as an output of the filter from the first signal output through the Rx path.

Figure 5:
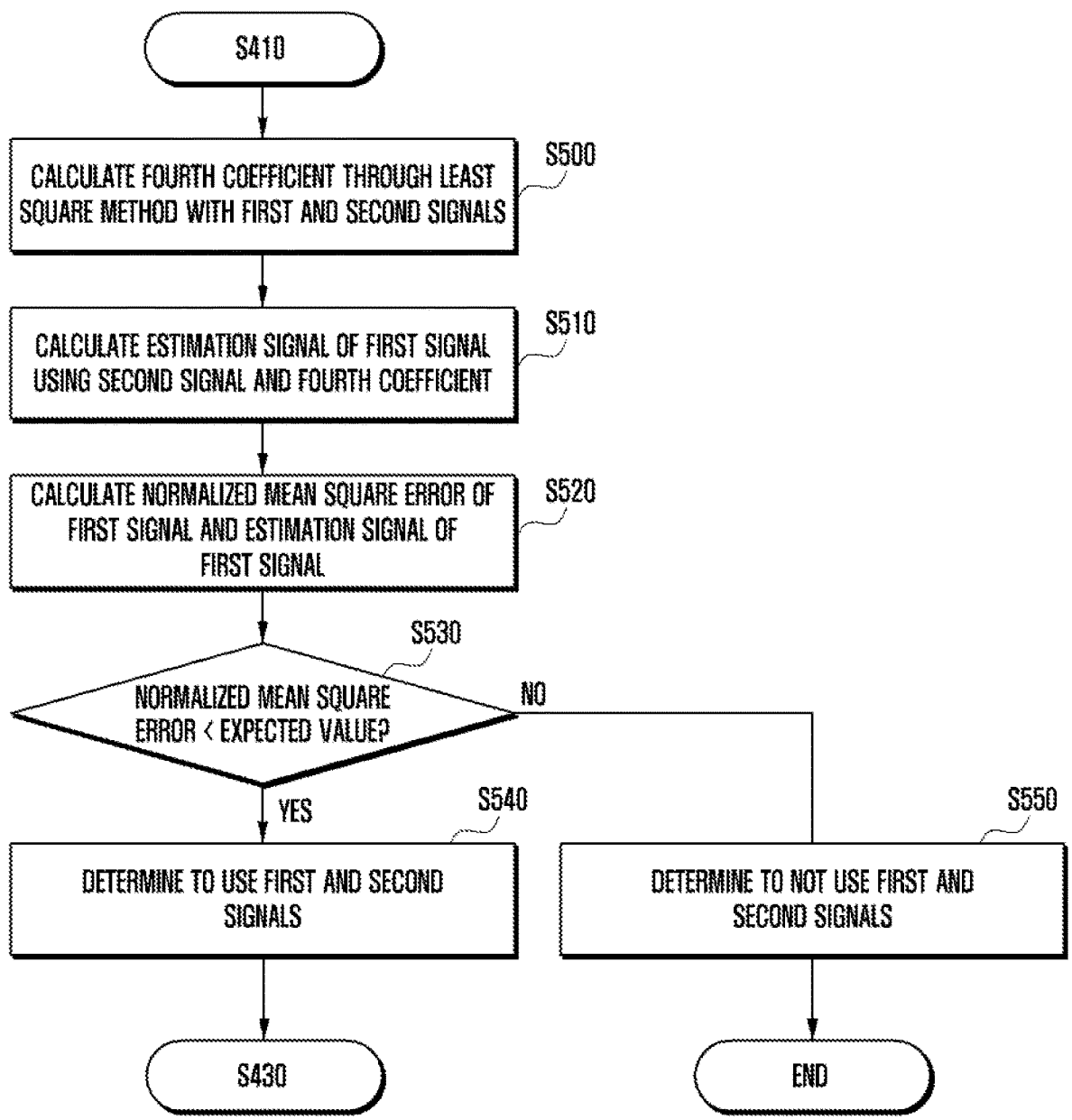
FIG. 5 is a flowchart illustrating a procedure of determining whether to use the first signal or the second signal that is depicted as a step in FIG. 4.

FIG. 5 is a flowchart illustrating a procedure of determining whether to use the first signal or the second signal that is depicted as a step in FIG. 4.

In reference to FIGS. 1 to 5, the base station may calculate a fourth coefficient at step S500 through a least square method with the first and second signals after step S410 of FIG. 4.

The base station may calculate an estimation signal of the first signal using the second signal and the fourth coefficient at step S510 and calculate a normalized mean square error of the first signal and the estimation signal of the first signal at step S520.

The base station may determine at step S530 whether the normalized mean square error is less than a preconfigured expected value.

If it is determined at step 530 that the normalized mean square error is less than a preconfigured expected value, the base station may determine, at step S540, to use the first and second signals for estimating (or updating) the filter coefficient. If it is determined to use the first and second signals for estimating (or updating) the filter coefficient, the procedure goes to step S430 of FIG. 4.

If it is determined at step 530 that the normalized mean square error is not less than a preconfigured expected value, the base station may determine, at step S550, to not use the first and second signals for estimating (or updating) the filter coefficient. If it is determined for the base station to not use the first and second signals for estimating (or updating) the filter coefficient, the Tx-to-Rx noise cancellation operation may be stopped.

Figure 6:
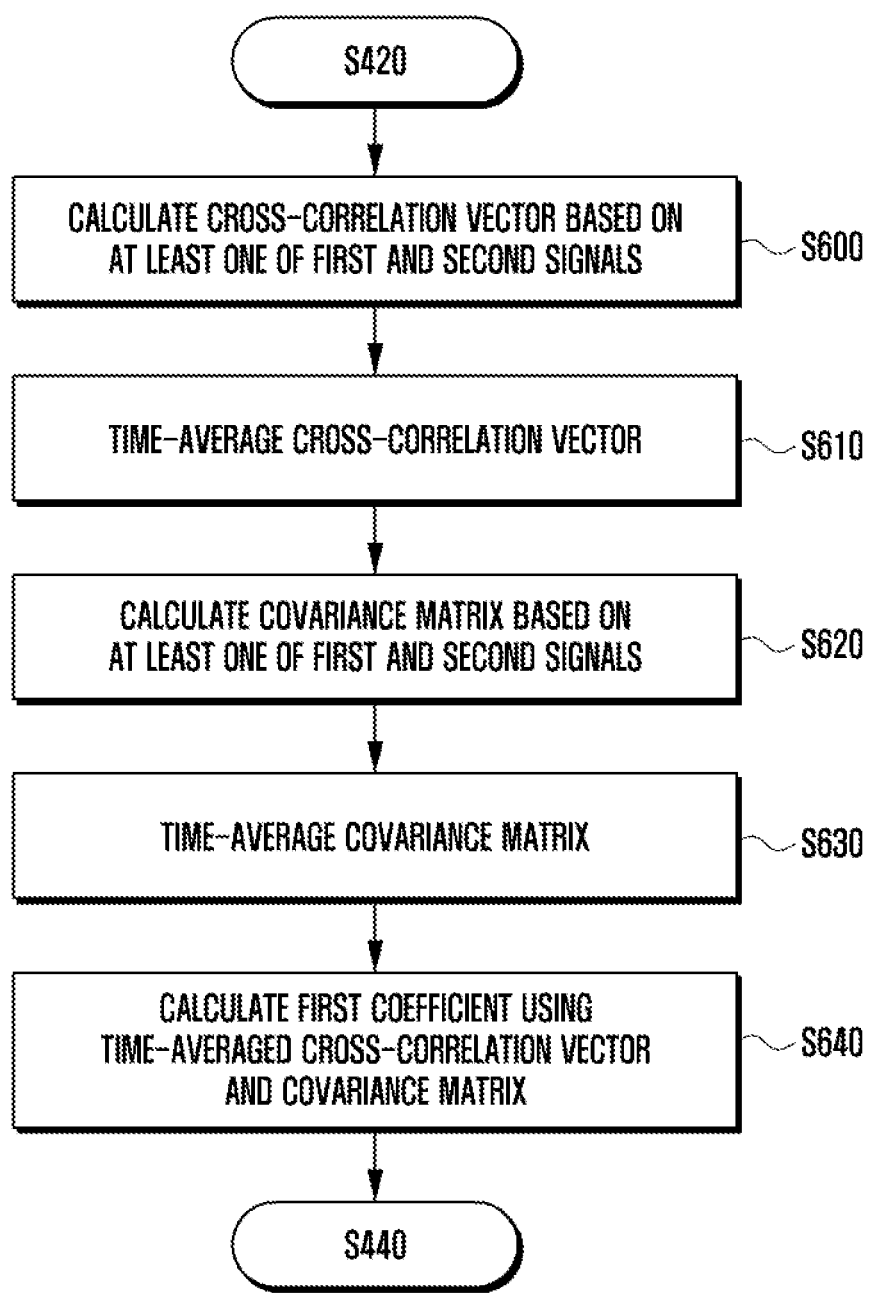
FIG. 6 is a flowchart illustrating a procedure of estimating the first coefficient that is depicted as a step in FIG. 4.

FIG. 6 is a flowchart illustrating a procedure of estimating the first coefficient that is depicted as a step in FIG. 4.

In reference to FIGS. 1 to 6, the base station may calculate, at step S610, the cross-correlation vector based on at least one of the first and second signals after step S420 of FIG. 4.

The base station may calculate the covariance matrix based on one of the first and second signals at step S620 and time-average the covariance matrix at step S630.

At step S640, the base station may calculate the first coefficient using the time-averaged cross-correlation vector and the covariance matrix. The base station may perform step S440 of FIG. 4 after calculating the first coefficient.

Figure 7:
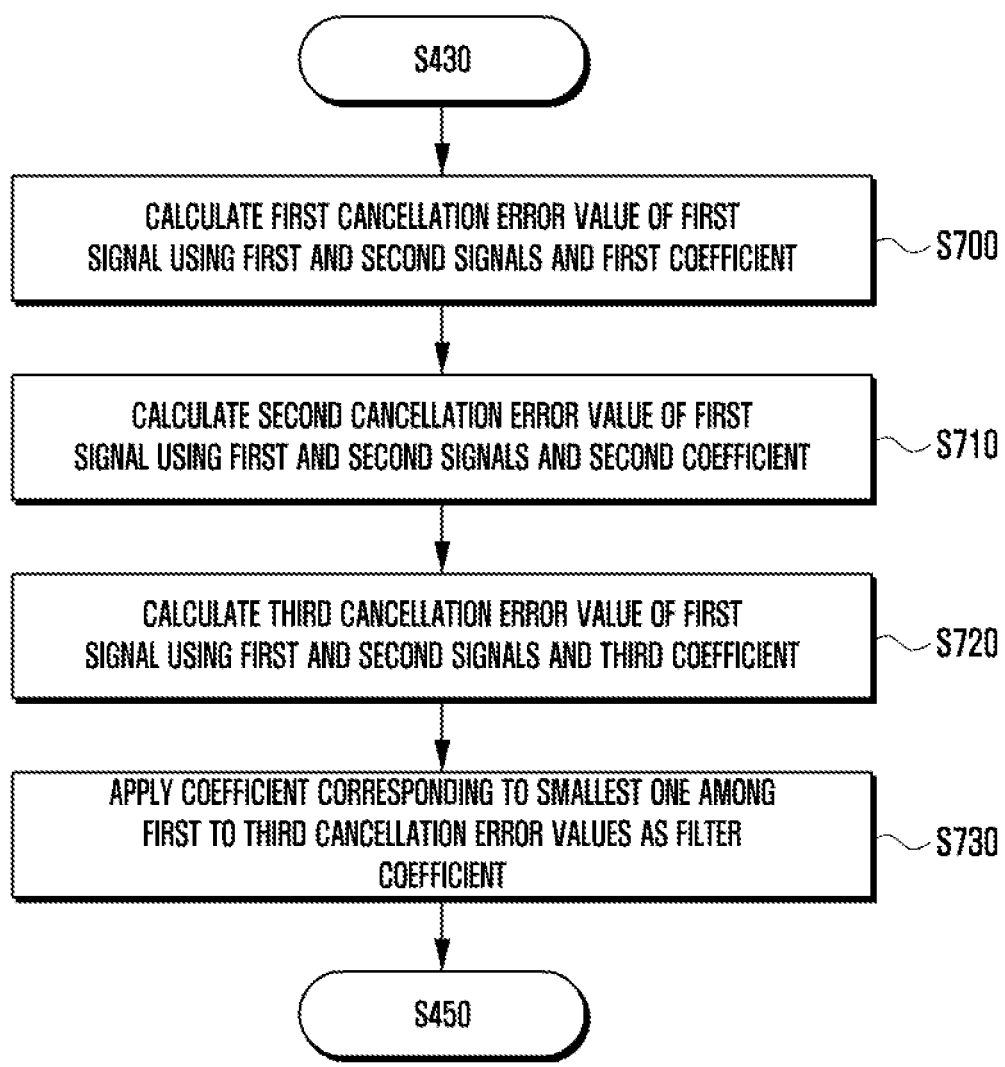
FIG. 7 is a flowchart illustrating a procedure of applying one of the first to third coefficients as the filter coefficient that is depicted as a step in FIG. 4.

FIG. 7 is a flowchart illustrating a procedure of applying one of the first to third coefficients as the filter coefficient that is depicted as a step in FIG. 4.

In reference to FIGS. 1 to 7, the base station may calculate a first cancellation error value of the first signal at step S700 using the first and second signals and the first coefficient after step S430 of FIG. 4.

The base station may calculate a second cancellation error value of the first signal using the first and second signals and the second coefficient at step S710 and calculate a third cancellation error value of the first signal using the first and second signals and the third coefficient at step S720.

At step S730, the base station may apply the smallest one of the first cancellation error value, the second cancellation error value, and the third cancellation error value as the filter coefficient.

Figure 8A:
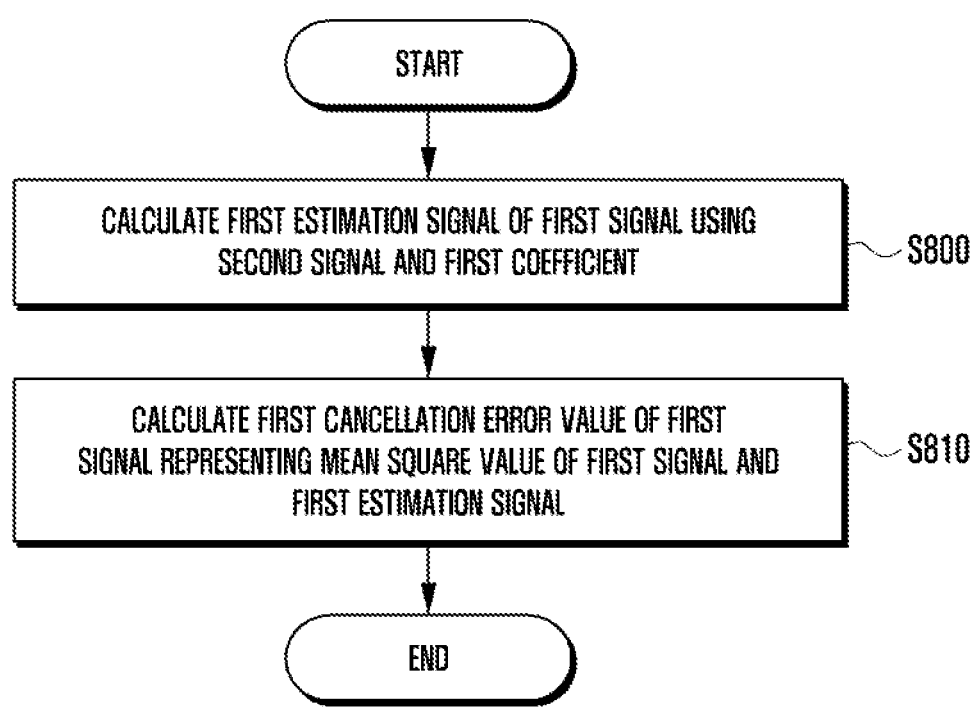
FIGS. 8A to 8C are flowcharts illustrating, respectively, procedures of calculating the first to third cancellation error values mentioned in FIG. 7.
Figure 8B:
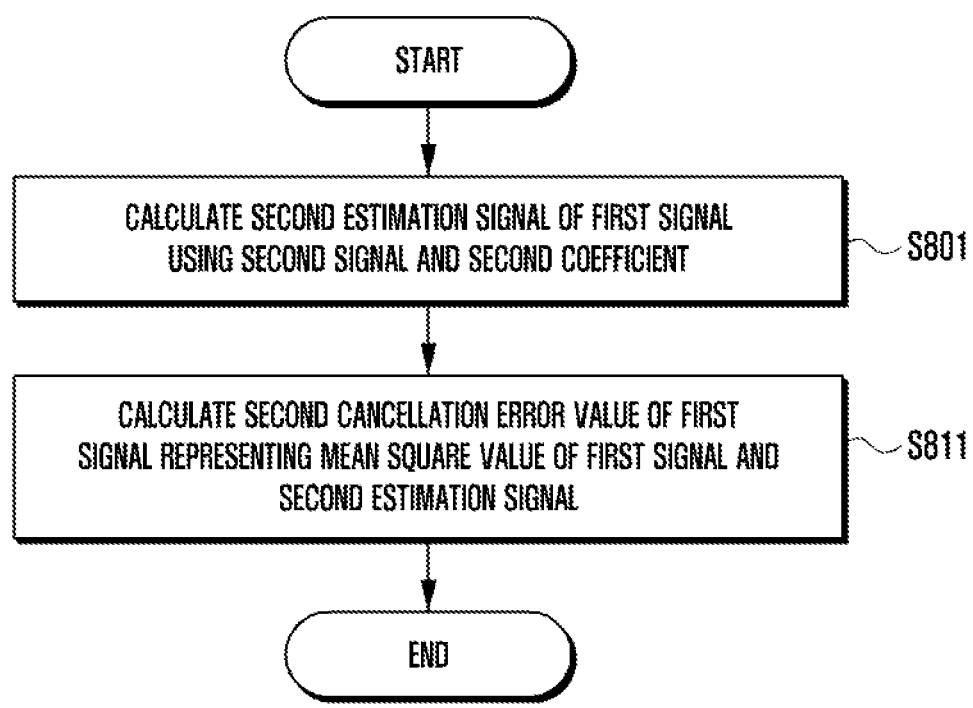
Figure 8C:
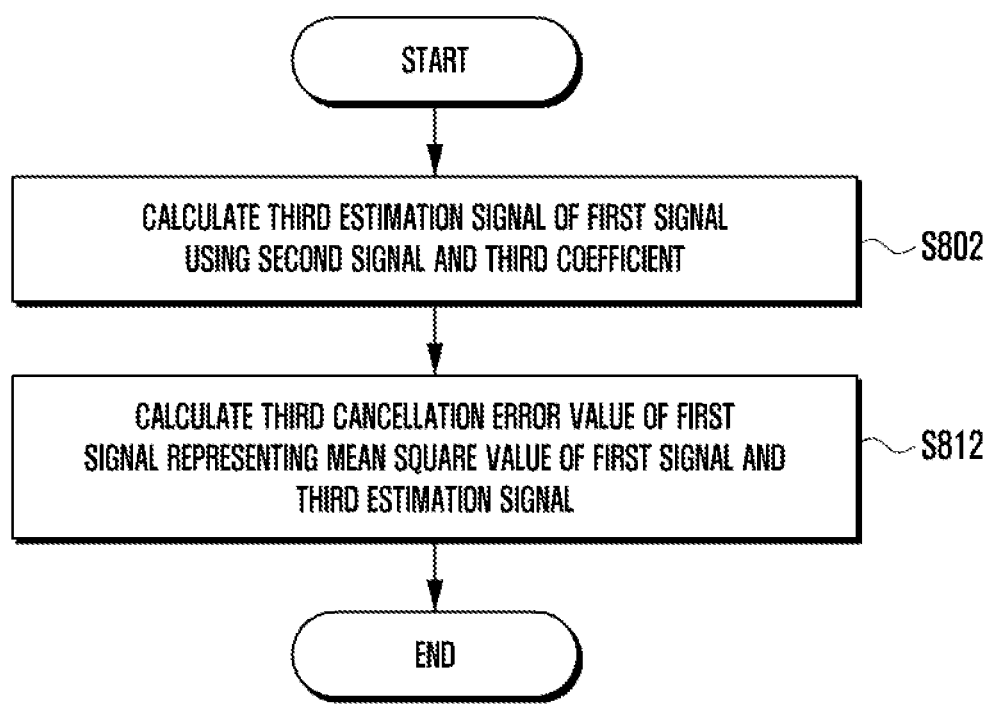

FIGS. 8A to 8C are flowcharts illustrating, respectively, procedures of calculating the first to third cancellation error values mentioned in FIG. 7.

In reference to FIGS. 1 to 8A, the base station calculates, at step S800, a first estimation signal corresponding to the first signal using the second signal and the first coefficient and calculates, at step S810, the first cancellation error value of the first signal that represents a mean square value of the first signal and the first estimation signal.

In reference to FIGS. 1 to 8B, the base station calculates, at step S801, a second estimation signal corresponding to the first signal using the second signal and the second coefficient and calculates, at step S811, the second cancellation error value of the first signal that represents a mean square value of the first signal and the second estimation signal.

In reference to FIGS. 1 to 8C, the base station calculates, at step S802, a third estimation signal corresponding to the first signal using the second signal and the third coefficient and calculates, at step S812, the third cancellation error value of the first signal that represents a mean square value of the first signal and the third estimation signal.

Figure 9:
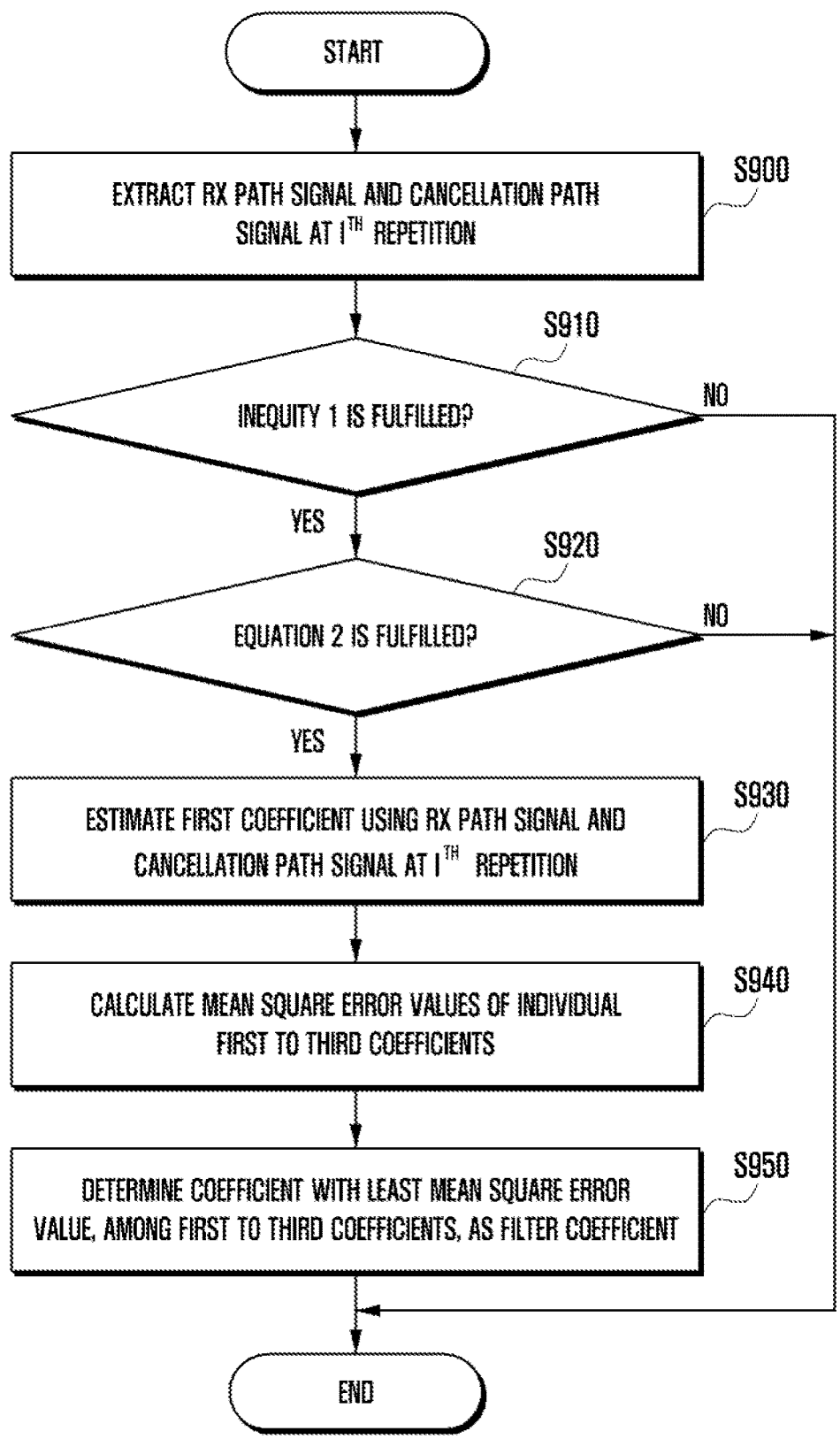
FIG. 9 is a flowchart illustrating an operation method of a base station for cancelling transmitter noise present in an Rx path using an equation according to an embodiment of the present invention.

FIG. 9 is a flowchart illustrating an operation method of a base station for cancelling Tx-to-Rx noise present in an Rx path using an equation according to an embodiment of the present invention.

In reference to FIGS. 1 to 9, the base station may extract, at step S900, an Rx path signal and a cancellation path signal at the $i^{th}$ repetition.

At step S910, the base station may determine whether the Rx path signal includes an uplink signal transmitted by a terminal based on whether Inequity 1 is fulfilled.

At step S920, the base station may determine whether to use the Rx path signal and the cancellation path signal in estimating (updating) a filter coefficient of a filter for outputting the Tx-to-Rx noise depending on whether Equation 2 is fulfilled.

At step S930, the base station may estimate a first coefficient using the Rx path signal and the cancellation path signal at the $i^{th}$ repetition. The base station may calculate a cross-correlation vector and a covariance matrix based on the Rx path signal and the cancellation path signal and estimate the first coefficient using the time-averaged cross-correlation vector and covariance matrix.

At step S940, the base station may calculate mean square error values of each of the first coefficient, the second coefficient, and the third coefficient. Here, the second coefficient is the coefficient that has been applied to the filter previously before the estimation of the first coefficient, and the third coefficient is the coefficient prestored as the optimal value in accordance with the temperature.

At step S950, the base station may determine the coefficient having the least mean square error value, among the first to third coefficients, as the filter coefficient. The base station may generate (or recover) the Tx-to-Rx noise based on the determined filter coefficient and remove the Tx-to-Rx noise to obtain the final Rx signal.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A base station for cancelling transmitter noise present in a reception band, the base station comprising:
   a transceiver configured to transmit and receive a signal;
   an uplink signal detector configured to check a first signal extracted from a reception path of the base station and a second signal extracted by filtering a signal being transmitted by the base station from a transmission path based on the reception band, and determine whether a power of an uplink signal, transmitted by a terminal, included in the first signal is less than a predetermined value based on a checking result; and
   a processor configured to determine whether to update one or more coefficients of a filter to cancel the transmitter noise depending on whether the power of the uplink signal is less than the predetermined value;
   wherein the processor is configured to control:
      if the power of the uplink signal is less than the predetermined value, to update the one or more coefficients of the filter; and
      if the power of the uplink signal is not less than the predetermined value, not to update the one or more coefficients of the filter.

2. The base station of claim 1, wherein the processor is configured to estimate a first coefficient by performing a first operation on the first and second signals and determine whether to apply the first coefficient as a coefficient for the filter outputting the transmitter noise.

3. The base station of claim 1, further comprising a final reception signal generator configured to output a final reception signal by cancelling the transmitter noise as an output of the filter from the first signal extracted from the reception path.

4. The base station of claim 2, wherein the processor is configured to apply one of the first coefficient, a second coefficient applied to the filter before estimating the first coefficient, and a third coefficient prestored as an optimal value in accordance with temperature as the filter coefficient.

5. The base station of claim 1, wherein the uplink signal detector is configured to compare a first power of the first signal and a second power of the second signal and determine, if a first value indicating the first power is less than a second value obtained by adding a noise power of the reception path to a predetermined ratio of the second power, that the first signal includes no uplink signal.

6. The base station of claim 5, wherein the processor is configured to calculate, if the first signal includes no uplink signal, a fourth coefficient value through a least square method with the first and second signals and determine, if a cancellation value of the first signal that is calculated with the first and second signals and the fourth coefficient is less than a preconfigured expectation value, to use the first and second signals.

7. The base station of claim 6, wherein the cancellation value is a normalized mean square error of the first signal and an estimated signal of the first signal, and the estimated signal is calculated with the second signal and the fourth coefficient.

8. The base station of claim 6, wherein the processor is configured to calculate a cross-correlation vector based on at least one of the first and second signals, time-average the cross-correlation vector, calculate a covariance matrix based on at least one of the first and second signals, time-average the covariance matrix, and estimate the first coefficient using the time-averaged cross-correlation vector and the covariance matrix.

9. The base station of claim 4, wherein the processor is configured to calculate a first cancellation value of the first signal using the first and second signals and the first coefficient, a second cancellation value of the first signal using the first and second signals and the second coefficient, and a third cancellation value of the first signal using the first and second signals and the third coefficient, and apply the coefficient corresponding to the least one among the first to third cancellation values as the filter coefficient.

10. The base station of claim 9, wherein the first cancellation value is a mean square error of the first signal and a first estimated signal of the first signal, the first estimated signal being calculated using the first signal and the first coefficient, the second calculation value is the mean square error of the first signal and the second estimated signal of the first signal, the second estimated signal being calculated using the second signal and the second coefficient, and the third cancellation value is the mean square error or the first signal and a third estimated value of the first signal, the third estimated value being calculated using the second signal and the third coefficient.

11. The base station of claim 1, further comprising:
a first analog-digital converter (ADC), configured to convert a signal output from a low-noise amplifier to a digital signal and output the digital signal as the first signal;
a first delay circuit configured to receive the first signal from the first ADC and extract the first signal; and
a memory buffer configured to transfer the first signal to the uplink signal detector.

12. The base station of claim 1, further comprising:
a second analog-digital converter (ADC), configured to convert a signal output from a reception (Rx) band-pass filter to a digital signal and output the digital signal as the second signal;
a second delay circuit configured to receive the second signal from the second ADC and extract the second signal; and
a memory buffer configured to transfer the second signal to the uplink signal detector.

13. An operation method of a base station for cancelling transmitter noise present in a reception band, the method comprising:
checking a first signal extracted from a reception path of the base station and a second signal extracted by filtering a signal being transmitted by the base station from a transmission path based on the reception band;
determining whether a power of an uplink signal, transmitted by a terminal, included in the first signal is less than a predetermined value based on a result of the checking;
determining whether to update one or more coefficients of a filter to cancel the transmitter noise depending on whether the power of the uplink signal is less than the predetermined value;
updating the one or more coefficients of the filter, if the power of the uplink signal is less than the predetermined value; and
not updating the one or more coefficients of the filter, if the power of the uplink signal is not less than the predetermined value.

* * * * *